United States Patent [19]

Schätzler et al.

[11] 4,272,122
[45] Jun. 9, 1981

[54] VEHICLE BODY MEMBER WITH AN OPENING CLOSABLE BY A COVER

[75] Inventors: Walter Schätzler, Aufhausen; Hans Jardin, Inning, both of Fed. Rep. of Germany

[73] Assignee: Webasto-Werk W. Baier GmbH & Co., Munich, Fed. Rep. of Germany

[21] Appl. No.: 10,468

[22] Filed: Feb. 8, 1979

[30] Foreign Application Priority Data

Feb. 28, 1978 [DE] Fed. Rep. of Germany ....... 2808452

[51] Int. Cl.³ .................................................. B60J 7/04
[52] U.S. Cl. ...................................... 296/221; 296/216
[58] Field of Search ........... 296/137 R, 137 E, 137 F, 296/137 G, 137 H, 137 J, 216, 221, 222, 223

[56] References Cited

U.S. PATENT DOCUMENTS

| | | | |
|---|---|---|---|
| 3,055,701 | 9/1962 | Golde et al. | 296/137 G |
| 3,610,682 | 10/1971 | Vermeulen | 296/137 E |
| 3,829,155 | 8/1974 | Lutz | 296/137 F |
| 3,949,625 | 4/1976 | Bienert | 296/137 H |
| 4,081,926 | 4/1978 | Jardin | 296/137 F |
| 4,084,848 | 4/1978 | Cunningham | 296/137 E |

FOREIGN PATENT DOCUMENTS

| | | | |
|---|---|---|---|
| 1117421 | 11/1961 | Fed. Rep. of Germany | 296/137 G |
| 2245084 | 3/1974 | Fed. Rep. of Germany | 296/137 E |
| 2532187 | 2/1977 | Fed. Rep. of Germany | 296/137 F |
| 2551335 | 5/1977 | Fed. Rep. of Germany | 296/137 F |
| 2323835 | 3/1978 | Fed. Rep. of Germany | 296/137 G |
| 2648664 | 5/1978 | Fed. Rep. of Germany | 296/137 E |

Primary Examiner—John J. Love
Assistant Examiner—Ross Weaver
Attorney, Agent, or Firm—Craig and Antonelli

[57] ABSTRACT

A vehicle body member such as a roof of a motor vehicle is provided with an opening surrounded by a frame and a cover panel for opening and closing the body member opening. The cover is guided in guide tracks by front and rear sliding shoes for displacement in a direction parallel to the guide tracks and is mounted for pivotable movement about an axis running at right angles to the displacement direction near a forward edge thereof. The cover is further provided with lifting elements which are connected to the rear sliding shoes, which shoes are drivingly connected to incompressible cables arranged in guide tubes and displaceable by an actuating device that is mounted on the cover panel. According to a preferred embodiment, so as to provide a significantly simpler design that is capable of being manufactured much less expensively, the ends of the above-noted guide tubes are displaceably mounted in or on the rear sliding shoes and are running approximately parallel to the guide tracks.

25 Claims, 9 Drawing Figures

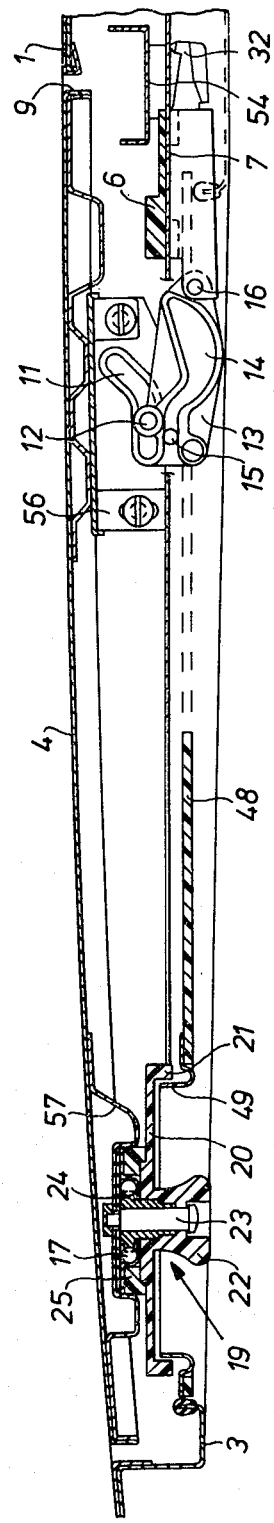
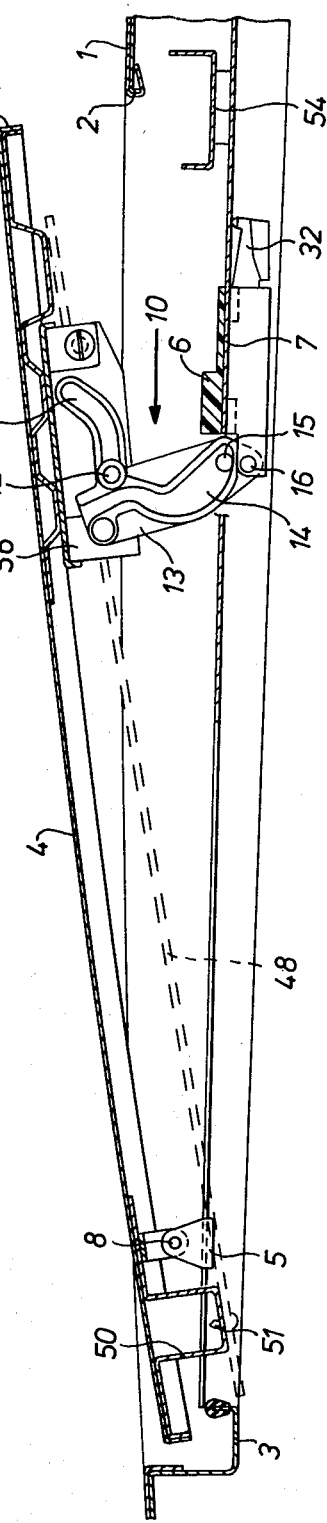
Fig.2
Fig.3

VEHICLE BODY MEMBER WITH AN OPENING CLOSABLE BY A COVER

BACKGROUND AND SUMMARY OF THE INVENTION

The invention relates to a vehicle body member with an opening surrounded by a frame such as sun roofs of motor vehicles. A roof of this kind is known for example from German Pat. No. 2016492. In this known roof, displacement of the sliding shoes and consequently the raising and lowering movement of the rear edge of the cover from the closed position of the cover is effected by means of a crank, said crank being disposed in the fixed part of the roof in the vicinity of the forward edge of the roof opening.

These known sliding roofs are relatively complicated and correspondingly expensive due to the fact that the crank mechanism and the cable guides must be installed as separate units on the fixed roof, the fact that the cable guides must pass through a wall of the rain gutter surrounding the roof opening at some point and this point must be sealed, and the fact that the cable must have a length which corresponds to the entire displacement path of the cover and the cable guide tubes must be sufficiently long to be able to accept the cable both with the cover in the closed position and with the cover completely retracted.

The invention is intended to provide a motor vehicle roof of the type described hereinabove, said roof being distinguished by a significantly simpler design and therefore capable of being manufactured much less expensively.

This goal is achieved according to a preferred embodiment, by displaceably mounting the ends of the above-noted guide tubes in or on rear sliding shoes and arranging said ends approximately parallel to guide tracks for the shoes and disposed laterally in the frame.

Additionally, by mounting the actuating device on the cover, the amount of assembly work to be performed on the vehicle roof to mount the guide tracks for the cover is reduced. All of the components for guiding the cover and for raising and lowering the rear edge of the cover can be prefabricated together with the guide tracks so that after the guide tracks have been mounted on the vehicle roof, in most instances it is only necessary to simply bolt the cover in place and possibly to adjust the height of the cover in order to ensure that the cover is flush with the fixed part of the roof when closed. The fact that the actuating device is displaced together with the cover means that the cables and cable guide tubes can be very short. No sealing problems arise, since the cable guide tubes do not need to pass through any rain gutter walls.

In order to be able to stop the sliding cover in various positions as it is retracted, the guide tracks are provided with latching holes according to another aspect of the invention. Preferably, these holes cooperate with latching hooks mounted swivelably on the sliding shoes, said hooks being displaceable into their latching positions by spring force, as a result of which, by designing the ends of the cables with sufficient play with respect to the sliding shoes, they first bring the latched latching hooks into their unlatched position and then displace the sliding shoes when displaced in at least one direction. Advantageously, the design can be made such that the ends of the cables act directly on the latching hooks.

Preferably, the actuating device is a twist grip, which, when rotated against a spring force in a rotational direction which corresponds to the closing movement direction of the cover, it first displaces the rear sliding shoes to lower the rear edge of the cover, and then releases the lock on the cover, and in the other rotational direction displaces the sliding shoes to raise the rear edge of the cover. The cover is displaced by the cover being pushed forward or backward by a handle mounted at right angles to the displacement direction. When the twist grip is released, it returns under the action of the springs until the cables are retracted and the latching hooks released, said hooks then being able to engage the closest latching holes in the guide tracks. The spring means for retracting the twist grip are preferably disposed directly in the sliding shoes and abut the cables at one end and a point on the sliding shoe at the other.

The twist grip can comprise a shell with a circular circumferential wall and a handle running diametrally. The cover can be locked simply in its closed position by providing the circumferential wall with at least one depression into which a locking element, mounted in a spring-loaded manner on the cover, latches in the closed position.

In order to inform the operator in simple fashion, in which direction he must turn the twist grip in order to release the lock and be able to slide the cover back, the handle, which has a left half and right half on either side of its rotational axis, can be provided on the forward side of one half and on the rear side of the other half with depressions to accept the fingers, when the grip is seized for rotation in the direction in which the rear edge of the cover is lowered for subsequent retraction of the cover. The arrangement is such that the handle is located at right angles to the displacement direction when the cover is in the closed position, and is rotated through 180° in one direction to lower the rear edge of the cover and release the cover lock, and through 360° in the other direction to raise the cover.

To facilitate installation, the ends of the tubes at the actuating side, in the vicinity of a drive pinion for the cable, connected with the twist grip, can be mounted in a mounting plate, located on an inside panel of the cover.

Normally, the cover is covered by a headlining on the side which faces the passenger compartment, said headlining consisting of fabric in known designs and being held in place by its own headlining frame. Aside from the cost which this necessitates, this design has the disadvantage, when the vehicle roof according to the invention is used, that a good seal in the vicinity of the twist grip is difficult to effect and means that the twist grip comes to rest against the headlining, and this in turn means that the twist grip can only be installed after the cover has been installed and the headlining fitted, so that the desired complete prefabrication is not feasible. These disadvantages can be overcome if a rigid headlining is used which has a circular upwardly projecting edge in the vicinity of the twist grip, which edge is located within a circumferential wall of a shell forming part of the twist grip, when assembled as part of the cover. This makes it possible to prefabricate completely the guide and tilting elements of the cover in the manner described hereinabove and, after installing the cover in the vehicle roof, to apply the headlining which then is fastened only in the vicinity of its leading edge to a cross member of the cover, for example, by clips, and held in the vicinity of its rear edge on both sides in known fashion by catches mounted on the cover, said catches holding the headlining in such manner, when the cover is closed, that the cover covers the roof opening in a largely gap-free manner when viewed from the vehicle interior even though the headlining is brought along with the cover when it is raised.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 2 is a cross section along line II—II in FIG. 1 on an enlarged scale, showing the cover in its closed position;

FIG. 3 is a cross section along line III—III in FIG. 1, on an enlarged scale, with the cover shown in its raised position;

DETAILED DESCRIPTION OF THE PREFERRED EMBODIMENT

Figure 1:
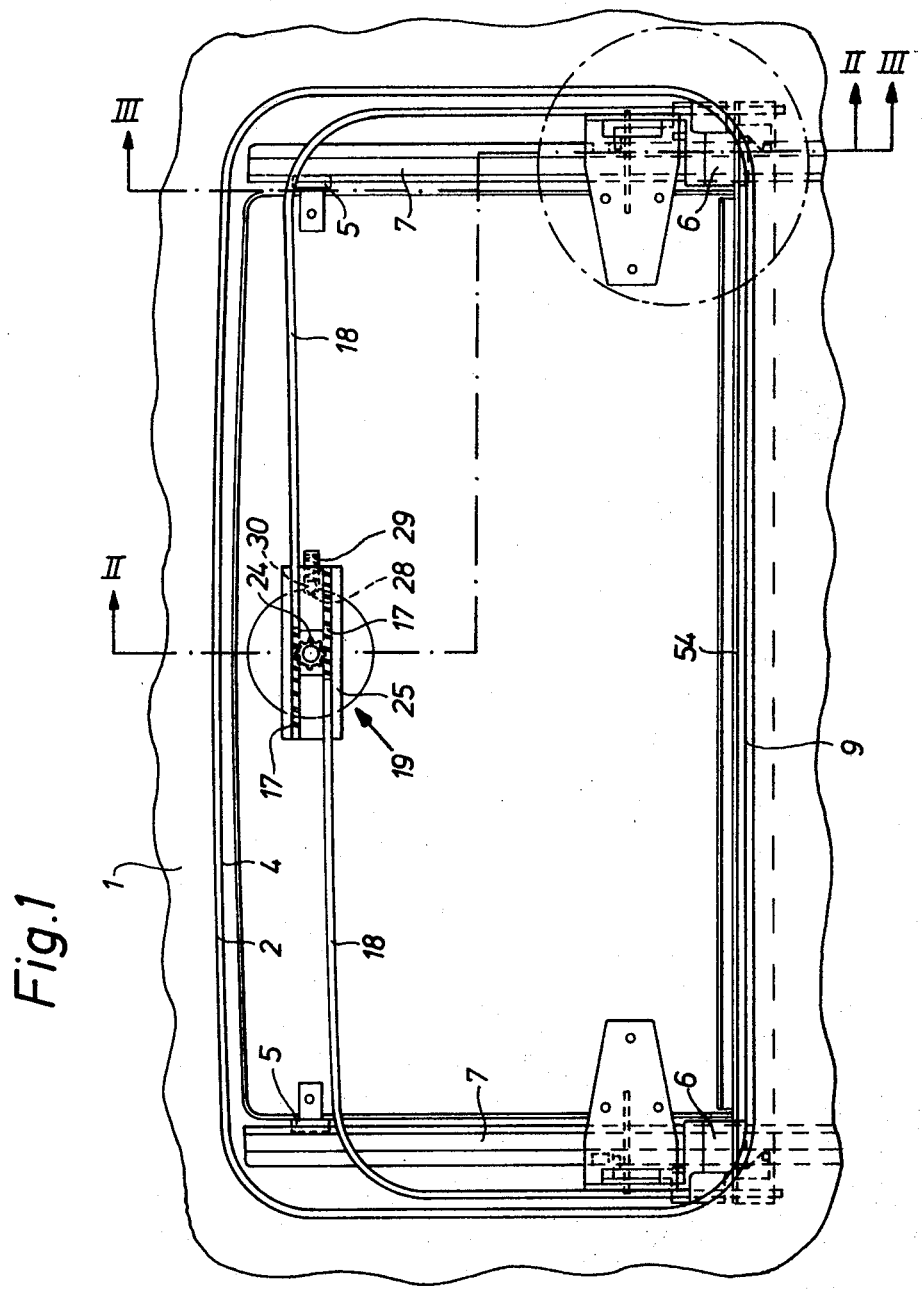
FIG. 1 is a top view of a vehicle roof according to the invention, with the cover panel omitted.

In the figures, reference number 1 designates the solid part of the vehicle roof, having a rectangular roof opening 2. The opening 2 is surrounded by a frame 3, which frame delimits a rain gutter along two lateral edges and the front edge of the roof opening. Roof opening 2 is closable by a rigid cover panel 4, which cover panel is guided in guide tracks 7, disposed laterally on frame 3, by means of forward sliding shoes 5 and rear sliding shoes 6. Cover panel 4 is swivelable about an axis running crosswise to displacement direction V in the vicinity of its leading edge, said axis being formed by the pivotal connections 8 between each of the forward sliding shoes 5 and cover panel 4.

Figure 4:
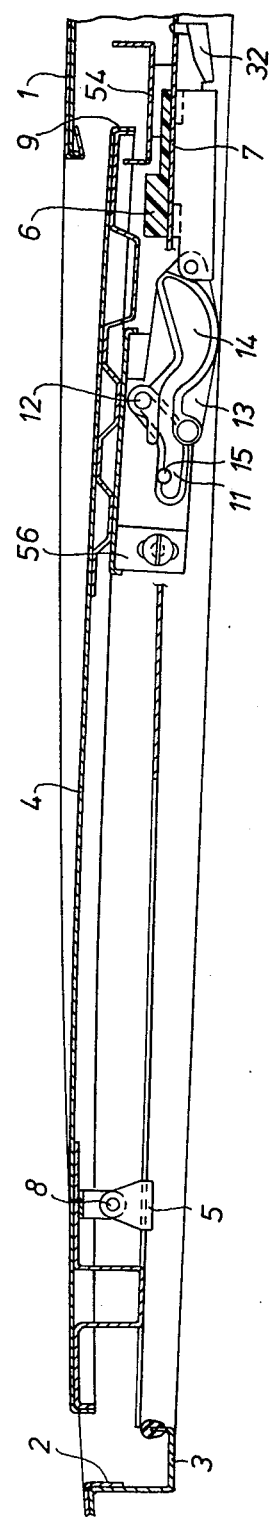
FIG. 4 is a cross section similar to FIG. 3, but with the cover in a lowered and slightly retracted position.

Sliding cover panel 4 can be moved out of roof opening 2 in two directions, namely, by raising its rear edge 9 above the solid roof 1, as shown in FIG. 3, thus producing the effect of a ventilating hatch, and by lowering the rear edge 9 of cover panel 4 and sliding said cover panel 4 backward beneath fixed roof part 1 (see FIG. 4).

To execute the raising and lowering movements of the rear edge 9 of the cover, lifting elements designated by the number 10 are generally provided between cover panel 4 and rear sliding shoes 6. The lifting elements shown in the illustrated embodiment include a crank slot 11 formed in a guide plate mounted to cover panel 4, a pin 12 engaged in slot 11, a lifting lever 13 which bears pin 12 with a slot guide 14, and a pin 15 mounted on guide track 7. Lifting elements of this type are known per se, for example, from German Pat. No. 2 016 492 and do not constitute any part of the present invention. The lifting elements are actuated by the sliding of the rear sliding shoes 6. As can be seen from FIGS. 2 and 3, sliding the rear sliding shoe 6 causes pin 12 to be displaced until it reaches the left end of crank slot 11 as shown in the drawing. As the sliding shoes continue moving further leftward as shown in the drawing, the cooperation between the fixed pin 15 and the curved crank slot 14 raises lifting lever 13, thus lifting rear edge 9 of the cover panel 4. When the rear sliding shoe 6 is displaced rightward from the closed position as shown in FIG. 2 in the drawing, the cooperation between pin 12 mounted on lever 13 and the bent crank slot 11 pulls the rear edge of the cover 9 downward as shown in FIG. 4. Lever 13 is connected to sliding shoe 6 by a pivot 16.

The displacement of rear sliding shoes 6, required to raise or lower the rear edge 9 of the cover, is accomplished with the aid of incompressible cables 17, said cables being guided in tubes 18 and capable of being displaced in either direction by means of a twist grip 19 mounted on cover panel 4. In the embodiment, twist grip 19 comprises a shell 20 with a circular circumferential edge 21 and a handle 22 running diametrically, said shell and said handle being integral or permanently connected with one another. Twist grip 19 is rotatably mounted on a shaft 23. A pinion 24, permanently connected to twist grip 19, engages incompressible cables 17, said cables being threaded. Pinion 24 rests in a recess in a mounting plate 25 that is attached to an inner wall of the cover panel 14 and in which plate the ends of tubes 18 are fastened, said plate also supporting twist grip 19. The other ends of tubes 18 are lengthwise displaceably mounted in bores 26 in sliding shoes 6.

It is evident that cables 17 and the sliding shoes 6 connected with them are displaced in one direction, for example to raise the rear edge 9 of the cover, when twist grip 19 and pinion 24 connected therewith are turned in one direction, and are displaced in the other direction, for example, to lower the rear edge 9 of the cover, when the twist grip and pinion are turned in the other direction. If the rear edge 9 of the cover is lowered as shown in FIG. 4, sliding cover panel 4 can be slid rearward beneath the fixed roof part 1 by pulling on twist grip 19. To close the roof opening, sliding cover panel 4 is pulled forward until its forward edge comes to rest against a seal, not shown, at the forward edge of roof opening 2. Twist grip 19 is then turned in such manner that sliding shoe 6 is moved leftward as shown in the drawing, whereby the rear edge 9 of the cover is lifted as a result of the interaction of pin 12 with crank slot 11 provided on the cover, until the cover has reached its closed position as shown in FIG. 4.

In order to inform the operator that the closed position has been reached, a lock is provided which consists, in the illustrated embodiment, of a recess 28, provided on the outer circumference of the circular edge 21 of twist grip 19, and a ball 30. The ball is mounted on mounting plate 25 and engages recess 28 under the force of a spring 29. When twist grip 19 is rotated further in the same direction, overcoming spring lock 28, 29, 30, sliding shoe 6 is displaced further leftward, so that fixed pin 15 raises lever 13 and hence the rear edge 9 of the cover in the manner described above by cooperating with crank slot 14. The distance which sliding shoe 6 must be displaced from the closed position for this raising movement is preferably dimensioned such that it corresponds to a complete 360° rotation of twist grip 19, so that when the cover is fully raised, locking ball 30 again engages recess 28. This has the advantage that undesirable closing of the roof, for example, under the pressure of the wind, is avoided.

As can be seen in FIG. 1, the rotary axis of twist grip 19 is located essentially on the pivot axis of cover panel 4. Hence, the sections of tubes 18, which run along the forward edge of the cover, can be disposed essentially on the pivot axis of the cover. Therefore, when the cover is swiveled, only a slight torsion develops on these tube sections which run parallel to the forward edge of the cover, but there is no lengthwise displacement of tubes 18.

Figure 8:
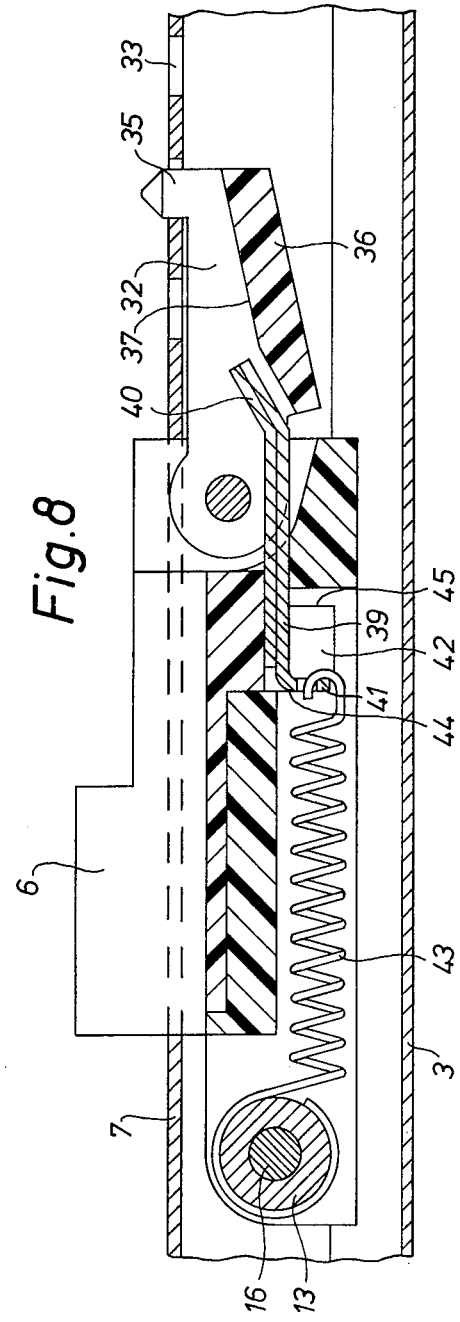
FIG. 8 is a locking device for the cover on an enlarged scale.
Figure 5:
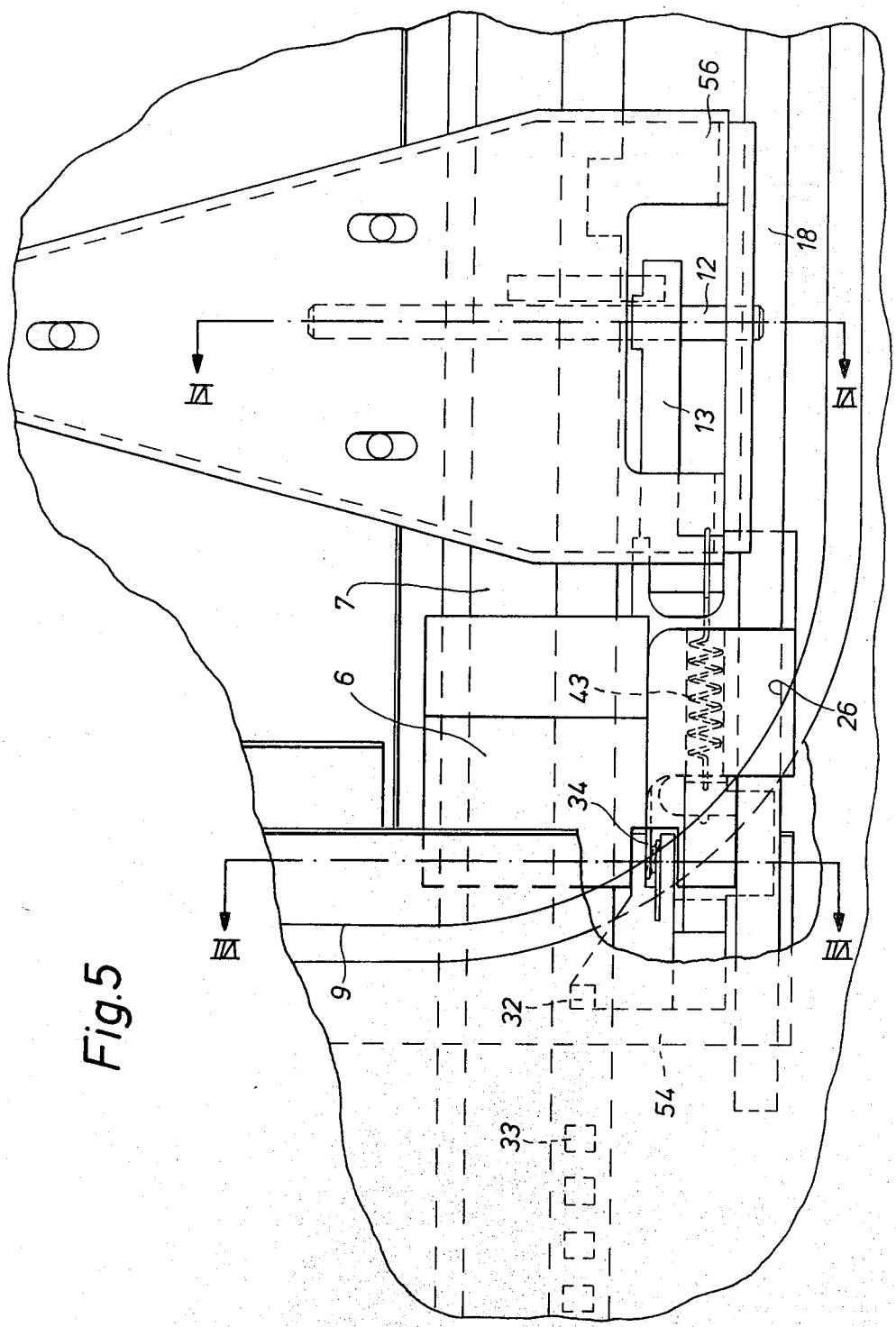
FIG. 5 is a partial cross section of the roof in area A in FIG. 1 on an enlarged scale.
Figure 7:
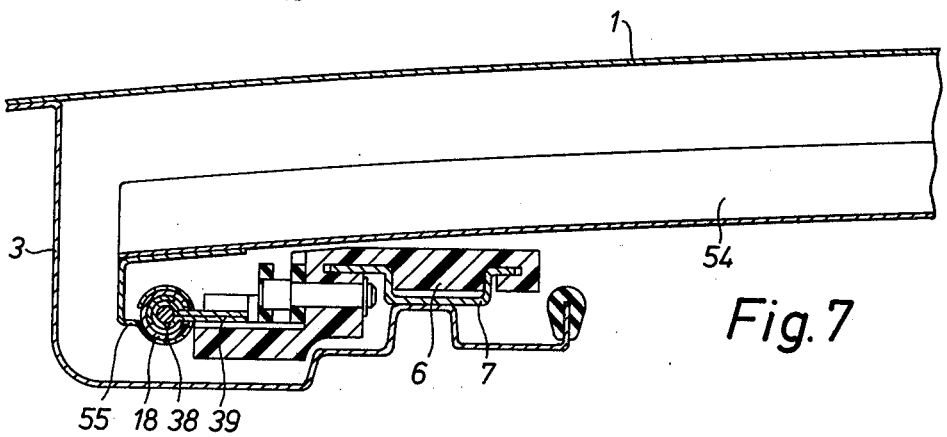
FIG. 7 is a cross section along line VII—VII in FIG. 5.

It is desirable for the sliding cover panel 4, as it is displaced rearward, to be lockable in various intermediate positions. For this purpose, a rotatable latching hook 32 is provided on each rear sliding shoe 6, said hook being latchable in one of the latching holes 33 provided in each guide track. The latching hook is subject to the action of a spring 34 which tends to move the hook into its latching position. The details of this locking means can be seen from FIG. 8. Latching hook 32 is provided with a pin 35, which can engage holes 33 in guide track 7, and a lateral projection 36 with a sloping surface 37. The end of each cable 17 which is opposite twist grip 19 is provided with a clip 38 (FIG. 7). The clip 38 has a lateral projection 39, which is bent upward at its rearward end 40 (FIG. 8), to form a sloping surface which cooperates with the sloping surface 37 of latching hook 32. Projection 39 extends through a longitudinal slot at the end of the tube 18. The forward end 41 of projection 39 is bent downward, and rests in a recess 42 in sliding shoe 6. An extension spring 43 is fastened at one end to end 41 to projection 39 and at the other end to pivot 16 of lifting lever 13. This spring 43 tends to pull end 41 against the lefthand limiting wall 44 of recess 42 as shown in FIG. 8, and also has a tendency to hold twist grip 19 in its resting position via cable 17.

When twist grip 19 is turned, to raise sliding cover panel 4, the sliding shoe 6 is displaced leftward in FIG. 8 by virtue of the fact that end 41 comes to rest against wall 44 of recess 42 in sliding shoe 6, whereupon the lifting process described hereinabove takes place. Sliding shoe 6 is not blocked by latching lever 32, since pin 34, as can be seen from FIGS. 2 and 3, does not latch in a latching opening 33 when cover panel 4 is in the closed position, but rests against the underside of guide track 7.

If cover panel 4 is to be slid back, twist grip 19 is rotated in the opposite direction from the position which corresponds to the closed position of the cover, whereupon cable 17 is displaced rearward and each cable 17 moves the corresponding sliding shoe 6, while end 41 of projection 39 is held by spring 43 against the forward limiting wall 44 of recess 42. This displacement causes the rear edge 9 of the cover 2 to lower. By turning twist grip 19 further, each cable 17 is further displaced against the tension of spring 43 until the end 41 of projection 39 comes to rest against the rear limiting wall 45 of recess 42 in sliding shoe 6. This displacement of projection 39 relative to sliding shoe 6 means that the other end 40 of projection 39 cooperates with the sloping surface 37 of latching hook 32, and holds latching hook 32 in its extended position or moves it to its withdrawn position.

Cover panel 4 can be slid back by pulling on handle 19. When handle 19 is released, each spring 43 pulls the corresponding cable 17 forward, whereupon handle 19 returns to its resting position, and the end 40 of projection 39 simultaneously is disengaged from sloping surface 37 of latching hook 32. Spring 34 is then in a position to swivel latching hook 32 upward, so that pin 35 can engage one of the holes 33 in guide track 7. To release the lock, twist grip 19 is again rotated in the same direction, causing each cable 17 to move rearward, whereupon the end 40 of each projection 39 pushes the corresponding latching hook 32 downward against the action of spring 34 and pulls pin 35 out of the latching hole 33 in question. Cover panel 4 can then be displaced forward or rearward into the desired position.

The arrangement is made such that handle 22 of twist grip 19 is located at right angles to displacement direction V when the cover is in the closed position. To raise the cover panel 4, handle 19 is rotated through 360° in one direction so that it again comes to rest at right angles to the displacement direction when the cover is raised, and, as mentioned above, is held in this position by the spring-loaded ball 30. To slide cover 4 backward, twist grip 19 is turned in the other direction out of the position that corresponds to the closed position, whereupon the rear edge 9 of the cover is lowered by turning the handle through approximately 135°. During this movement, each sliding shoe 6 is displaced by the corresponding cable 17 via springs 43. If resistance to displacement of sliding shoe 6 is caused by pin 35 engaging the first latching hole 33, further rotation of the twist grip through another 45° displaces cable 17 relative to sliding shoe 6 by tensioning spring 43, until latching hook 32 is released in the manner described above. To slide back the cover, handle 22 is once again at right angles to the displacement direction.

Figure 9:
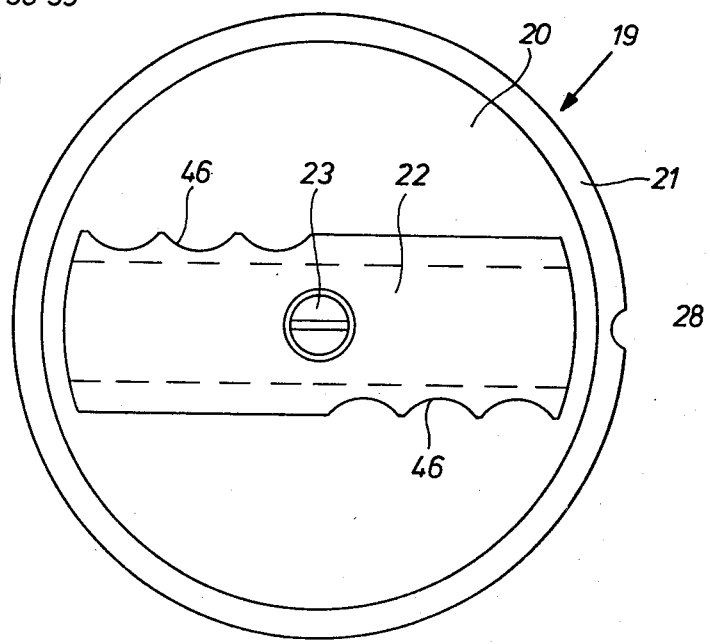
FIG. 9 is a top view of the twist grip.

In order to make it easier for the operator to operate twist grip 19, finger grooves 46, as shown in FIG. 9, are provided on the forward side of one half of handle 22 and on the rear side of the other half of said handle. These sides of the handle 22 are gripped when the twist grip is to be rotated to lower the rear edge 9 of the cover and to release locking hook 32.

Figure 6:
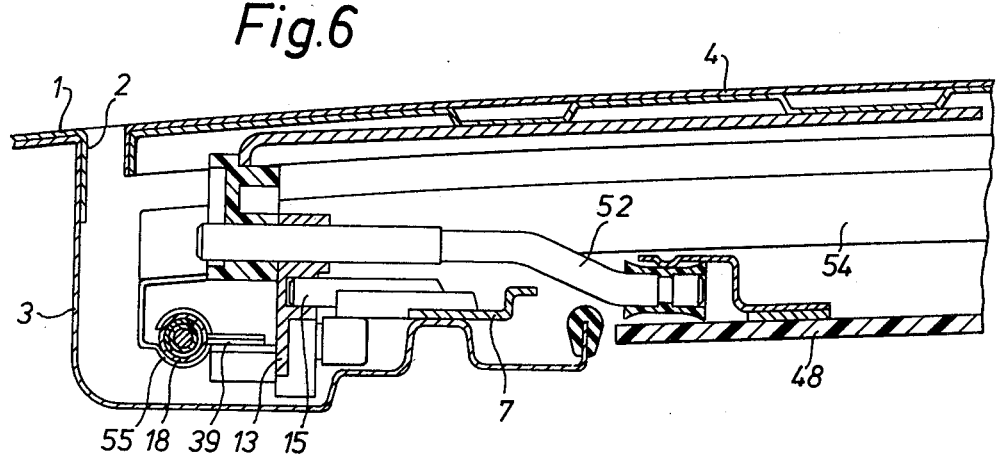
FIG. 6 is a cross section along line VI—VI in FIG. 5.

Sliding cover 4 is separated from the interior roof of the vehicle by a rigid headlining 48, said headlining being provided with a circular, upwardly projecting edge 49 in the vicinity of twist grip 19, said edge being located inside the circumferential wall 21 of twist grip shell 20. This is shown in FIG. 2. In the vicinity of its forward edge, headlining 48 is fastened to a cross member 50 of cover panel 4, for example by spring clips 51. In the vicinity of its rear edge, headlining 48 is held on each side by a carrier 52 (FIG. 6), said carrier being formed by an offset pin, constituting an extension of pin 12. The offset design of carrier pin 52 causes headlining 48 to be raised close to the underside of cover panel 4 when said cover is raised, as shown in FIG. 3. This lifting of headlining 48 relative to cover panel 4 is produced by the fact that the offset carrier pin 42 is correspondingly rotated as lifting lever 13 is raised. Reference number 54 refers to a rear rain gutter, provided on both lateral ends with a spring clamp 55, said clamp holding the rain gutter 54 on the ends of tube 18. A locking pin, not shown, can be provided to prevent it from slipping off.

The design according to the preferred embodiment of the invention is characterized, among other things, by the fact that the entire guide, actuation, and displacement mechanism for cover panel 4 can be prefabricated, so that the work involved in installing it in the vehicle roof itself is minimized. Thus, twist grip 19 with cables 17 and tubes 18, lifting elements 10, rear sliding shoes 6, and guide tracks 7 are preassembled, whereby the rear rain gutter 54 serves to determine the correct spacing between the two guide tracks 7. The forward sliding shoes 5 are also slid onto guide tracks 7. Then this module is inserted in the roof opening and it is merely necessary to bolt the guide tracks 7 to frame 3, insert cover panel 4, and connect the cover to the forward sliding shoes 5 and components 56 which support crank slot 11, bolt the twist grip 19 and the mounting plate 25 which holds one end of each of tubes 18 to the inside surface 57 of cover panel 4, and finally to apply the headlining 48. The fact that headlining 48 fits over handle shell 20 and not beneath it with respect to cover panel 4, as is conventional, allows all necessary adjustments to be made with the mechanical system functional, since headlining 48 is the last component to be installed.

Of course, many variations of the embodiment shown are possible without going beyond the scope of the invention. Thus, return spring 43 can be disposed at a different point, and can act, for example, directly on twist grip 19. Other lifting elements can also be used, for example, those described in German Auslegeschrift No. 1,605,960. Likewise, while reference has been made herein to use of the preferred embodiment with respect to motor vehicles, application of the invention to unmotorized vehicles, such as trailerhomes and the like is intended to be within the scope of this invention.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A vehicle roof member comprising a fixed roof section with an aperture surrounded by a frame and a cover panel for opening and closing said body member aperture guide tracks disposed laterally in said frame, and being provided with latching holes, said cover being guided in said guide tracks by front and rear sliding shoes for displacement in a direction parallel to said guide tracks between a first, closed, position sealing said aperture and a second, open, position uncovering said aperture, pivot means mounting said cover panel for pivotable movement about an axis running at right angles to the displacement direction near a forward edge of the cover panel for enabling said cover panel to be swung upwardly about said axis from said first position to a third, open, position wherein a rear edge of said cover panel is positioned above said roof member, said cover being further provided with lifting elements, said lifting elements being connected to the rear sliding shoes, an actuating device drivingly connected to incompressible cables guided in tubes for displacing said rear sliding shoes, said actuating device being mounted on the cover panel, latching hooks swivelably mounted on the rear sliding shoes and for engaging with said latching holes, latching spring means for moving said hooks into a latching position, unlatching means connected to said cables for displacing said latching hooks from said latching position, and connection means interconnecting the ends of said cables with play to the rear sliding shoes and being so constructed that, when displaced in at least one direction, the cables initially bring latching hooks which are in a latched position into an unlatched position and then displace the rear sliding shoes.

2. A vehicle roof member comprising a fixed roof section with an aperture surrounded by a frame and a cover panel for opening and closing said body member aperture guide tracks disposed laterally in said frame and being provided with latching holes, said cover being guided in said guide tracks by front and rear sliding shoes for displacement in a direction parallel to said guide tracks between a first, closed, position sealing said aperture and a second, open, position uncovering said aperture, pivot means mounting said cover panel for pivotable movement about an axis running at right angles to the displacement direction near a forward edge of the cover panel, an actuating device drivingly connected to incompressible cables guided in tubes for displacing said rear sliding shoes, said actuating device being mounted on the cover panel, and ends of said tubes being displaceably mounted approximately parallel to said guide tracks running along the rear sliding shoes, latching hooks swivelably mounted on the rear sliding shoes and for engaging with said latching holes for securing said cover panel in intermediate positions between said first and second positions, said latching hooks being disengaged in said first position, latching spring means for moving said hooks into a latching position, connection means interconnecting the ends of said cables with play to the rear sliding shoes and unlatching means connected to said cables for displacing said latching hooks from said latching holes when said cables are displaced in at least one direction, the cables initially bringing latching hooks which are in a latched position into an unlatched position and then displacing the rear sliding shoes.

3. A vehicle body member according to claim 2, wherein said body member is a vehicle roof.

4. A vehicle roof member according to claim 1, wherein the ends of the tubes extend rearward beyond the rear sliding shoes and are connected together by a component which serves as a rear rain gutter.

5. A vehicle body member according to claim 2 wherein the unlatching means is a part of the ends of said cables and act directly upon the latching hooks when displaced in one direction.

6. A vehicle member according to claim 1 or 2, wherein said latching hooks are provided with a sloping surface and wherein said unlatching means is a projection which is engageable with said sloping surface for displacing said latching hooks from said latching position.

7. A vehicle member according to claim 1 or 6, comprising return spring means disposed in the rear sliding shoes and engaging said cables and said rear sliding shoes at opposite ends thereof for biasing said actuating device toward said rest position.

8. A vehicle roof member according to claim 6, wherein the actuating device comprises a twist grip having a shell with a circular circumferential edge and a diametral handle, said circumferential edge being provided with at least one depression, a releasable detent member being engageable therein.

9. A vehicle body member according to claim 8, comprising return spring means disposed in the rear sliding shoes and engaging said cables and said rear sliding shoes at opposite ends thereof for biasing said twist grip toward a rest position.

10. A vehicle member according to claim 1 or 2, wherein the actuating device comprises a twist grip having a shell with a circular circumferential edge and a diametral handle, said circumferential edge being provided with at least one depression, a releasable detent member being engageable therein.

11. A vehicle roof member according to claim 8, wherein said handle is positioned with one half thereof on the left and one half thereof on the right of the rotational axis of the twist grip and is provided on a forward side of one half and on a rear side of the other half with finger-grip depressions for receiving the fingers of a user when the handle is turned in the direction in which the rear edge of the cover is lowered for subsequent sliding backward of the cover.

12. A vehicle roof member according to claim 10, wherein said handle is positioned with one half thereof on the left and one half thereof on the right of the rotational axis of the twist grip and is provided on a forward side of one half and on a rear side of the other hand with finger-grip depressions for receiving the fingers of a user when the handle is turned in the direction in which the rear edge of the cover is lowered for subsequent sliding backward of the cover.

13. A vehicle roof member according to claim 8, comprising, a mounting plate, and a drive pinion, ends of the tubes being mounted in said mounting plate in the vicinity of the drive pinion, said drive pinion engaging said cables and being connected with the twist grip, and said mounting plate being attached to an inner wall of the cover panel.

14. A vehicle roof member according to claim 10, comprising a mounting plate, and a drive pinion, ends of the tubes being mounted in said mounting plate in the vicinity of the drive pinion, said drive pinion engaging said cables and being connected with the twist grip, and said mounting plate being attached to an inner wall of the cover panel.

15. A vehicle roof member according to claim 8, wherein said twist grip shell has a downwardly projecting circumferential wall, and further comprising a rigid headlining, said cover panel being covered by said rigid headlining on a side which faces a passenger compartment of the vehicle, said headlining being provided with a circular, upwardly projecting edge in the vicinity of the twist grip, said edge being located inside the circumferential wall of the twist grip shell.

16. A vehicle member according to claim 10, wherein said twist grip shell has a downwardly projecting circumferential wall, and further comprising a rigid headlining, said cover panel being covered by said rigid headlining on a side which faces a passenger compartment of the vehicle, said headlining being provided with a circular, upwardly projecting edge in the vicinity of the twist grip, said edge being located inside the circumferential wall of the twist grip shell.

17. A vehicle roof member according to claim 15, comprising a cross-member rigidly secured to the cover panel and carriers rotatably carried by said cover panel and wherein the headlining is fastened in the vicinity of its forward edge to the cross member of the cover panel and is held in the vicinity of its rear edge on both sides by said carriers.

18. A vehicle roof member comprising a fixed roof section with an opening surrounded by a frame and a cover panel for opening and closing said body member opening, guide tracks disposed laterally in said frame and being provided with latching holes, said cover being guided in said guide tracks by front and rear sliding shoes for displacement in a direction parallel to said guide tracks between a first, closed, position sealing said aperture and a second, open, position uncovering said aperture, pivot means mounting said cover panel for pivotable movement about an axis running at right angles to the displacement direction near a forward edge of the cover panel, an actuating device drivingly connected to incompressible cables guided in tubes for displacing said rear sliding shoes, said actuating device being mounted on the cover panel, and ends of said tubes being displaceably mounted approximately parallel to said guide tracks running along the rear sliding shoes, wherein said actuating device comprises a twist grip having a circular shell with a downwardly projecting circumferential wall and a diametral handle and further comprising a rigid headlining, said cover panel being covered by said rigid headlining on a side which faces a passenger compartment of the vehicle, said headlining being provided with a circular, upwardly projecting edge in the vicinity of the twist grip, said edge being located inside the circumferential wall of the twist grip shell, whereby functional testing and adjusting of all components can be achieved with said headlining removed.

19. A vehicle roof member according to claim 16 or 18, comprising a cross-member rigidly secured to the cover panel and carriers rotatably carried by said cover panel and wherein the headlining is fastened in the vicinity of its forward edge to the cross member of the cover panel and is held in the vicinity of its rear edge on both sides by said carriers.

20. A vehicle roof member according to claim 13, wherein said tubes have segments which run parallel to the forward edge of the cover panel, said segments being located essentially on the swivel axis of the cover panel.

21. A vehicle roof member according to claim 14, wherein said tubes have segments which run parallel to the forward edge of the cover panel, said segments being located essentially on the swivel axis of the cover panel.

22. A vehicle roof member according to claim 4, wherein the actuating device, cables, tubes, sliding shoes, lifting elements, guide tracks, and gutter are assembled to form a prefabricated module independent of said frame, said module being mountable in the frame, by securing the guide tracks to the frame, by bolting the cover to the forward sliding shoes, and the lifting elements to guide components.

23. A vehicle roof member according to claim 1, wherein said actuating device is selectively movable in first and second directions from a rest position corresponding to said first, closed, position of the cover panel, said actuating device being operable upon movement from said rest position in said first direction for acting upon said cables and connection means so as to displace the rear sliding shoes in a manner causing the rear edge of the cover to be lowered, and then holding said latching hooks out of said latching position by said unlatching means for enabling movement of said cover panel to said second, open, position and upon displacement from said rest position in said second direction for displacing the rear sliding shoes in a manner causing the rear edge of the cover to be raised for shifting said cover to said third, open, position.

24. Automotive vehicle roof with a roof aperture surrounded by a frame, a displaceable cover for opening and closing said aperture, said cover being mounted to be pivotable in the proximity of its front edge about an axis at right angles to a displacement direction of the cover and being provided with forward and rearward sliding blocks for guiding the cover in guide tracks mounted laterally to the frame, said rearward sliding blocks being connected to lifting elements connected with the rearward sliding blocks and being displaceable via pressure-resistant cables guided in tubes by means of an operating device, characterized in that the operating device, the cables, the tubes, the sliding blocks, the lifting elements, the guide tracks, and a rain gutter are combined into a preassembled unit which is mountable to the frame by attaching of the guide tracks to the frame.

25. An automotive vehicle roof according to claim 24, wherein said operating device is operable for both slidably displacing said cover panel rearwardly to uncover said aperture and for pivotally displacing said cover in a manner raising its rear edge to a position above said roof.

* * * * *